A. F. BOYD.
METHOD OF EXCLUDING AIR FROM LIQUORS ON TAP.
No. 17,073.
PATENTED APR. 21, 1857.
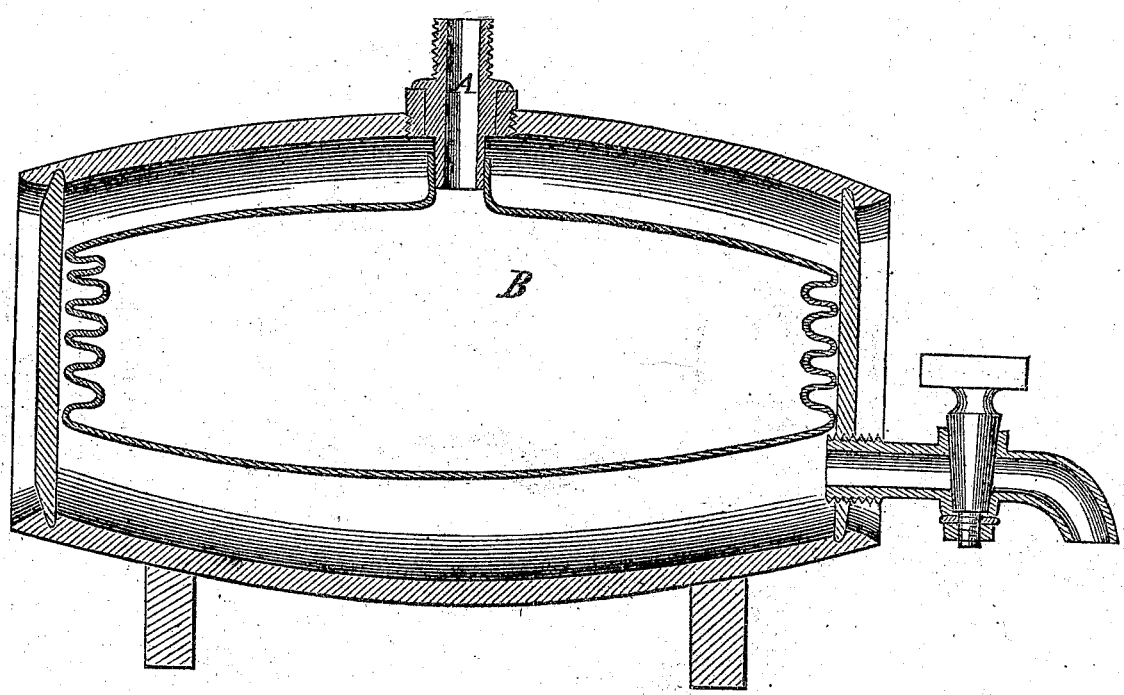
TAKEN FROM PATENT OFFICE REPORT
1857 - VOL. III.
ONLY DRAWING ACCESSIBLE (1912)

UNITED STATES PATENT OFFICE.

A. F. BOYD, OF MUSKINGUM COUNTY, OHIO.

IMPROVED METHOD OF EXCLUDING AIR FROM LIQUORS ON TAP.

Specification forming part of Letters Patent No. 17,073, dated April 21, 1857.

*To all whom it may concern:*

Be it known that I, ABSOLAM F. BOYD, of the county of Muskingum, in the State of Ohio, have invented a new and improved method of preserving the flavor of beer and other liquor when the cask is placed on "tap;" and I do hereby declare that the following is a full, clear, and exact description of the same, reference being had to the annexed drawings, making a part of this specification, in which—

Figure 1 shows a vertical section through an ordinary cask or barrel containing an india-rubber bag. The figure also shows a section of bag and the mode of its attachment to the bung-hole of the cask.

When beer and some other liquors are exposed to the atmosphere, they loose their flavor and become sour, and when a cask or barrel is placed on tap, the liquor is exposed to the atmosphere, because the bung has to be removed before it will flow at the cock C.

The nature of my invention consists in providing means whereby the atmosphere or any fluid may press upon the liquor without coming in contact with it, thus preserving its flavor while the cask is on tap, without interfering with its flow at the cock C. The make and operation is as follows: I take an ordinary cask or barrel, and in it I insert an india-rubber bag, as shown at B. On this bag I make a vat or tube, which I secure in the bung-hole of the cask by means of a tubular bung, as shown at A, so as to make an air-tight joint. The atmosphere or fluid is thus excluded from the inside of the barrel, but has free access to the inside of the bags. Now, when the barrel is filled with liquor, the bag will float on its surface, and being of a yielding nature the atmosphere or fluid will press upon the liquor without coming in contact with it, thus preserving its flavor without interfering with its discharge at the cock C.

If I should find it desirable, I design using a pump in connection with the above-described invention, so as to force air into the bag B, and thus elevate the liquor above its level in the barrel or cask, and if I find it expedient I shall place the liquor in the bag, and let the atmosphere act on the outside—that is, between the bag and the barrel.

What I claim as my invention is—

The application of the bag B to a cask or barrel, as shown and described, for the purpose of preserving the flavor of liquors by excluding the atmosphere from them when the cask is on tap, as described in this instrument, all of which I respectfully submit.

ABSOLAM F. BOYD.

Witnesses:
  F. A. SEBORN,
  H. HOWADTER.